UNITED STATES PATENT OFFICE.

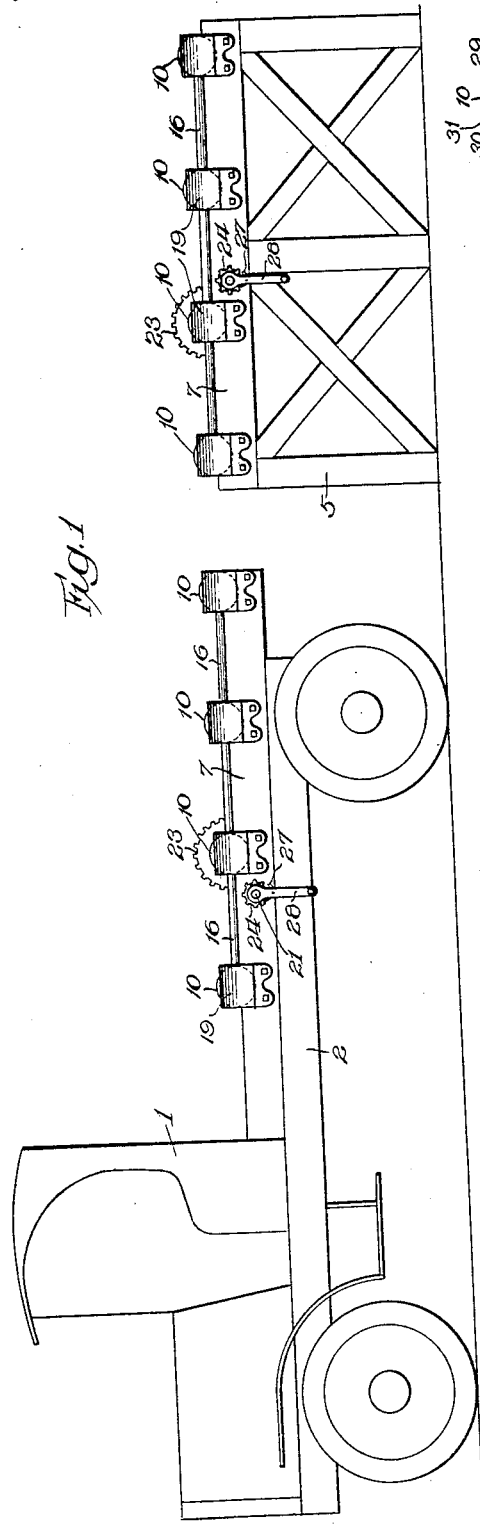
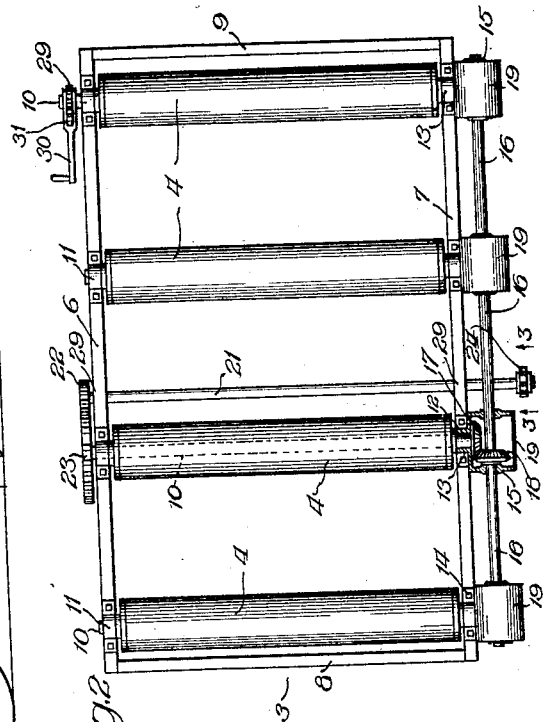
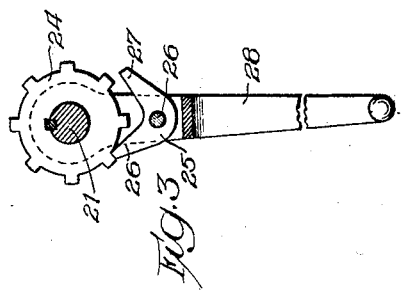

JOHN DYER, OF CHICAGO, ILLINOIS, ASSIGNOR OF ONE-HALF TO NORMAN C. MATHER, OF CHICAGO, ILLINOIS.

LOADING AND UNLOADING DEVICE.

1,386,053.   Specification of Letters Patent.   Patented Aug. 2, 1921.

Application filed February 16, 1920. Serial No. 359,116.

*To all whom it may concern:*

Be it known that I, JOHN DYER, a citizen of the United States, and a resident of the city of Chicago, in the county of Cook and State of Illinois, have invented a new and useful Improvement in Loading and Unloading Devices, of which the following is a full, clear, and exact description.

My invention relates to improvements in loading and unloading devices, and it consists in the combinations, constructions and arrangements herein described and claimed.

An object of my invention is to provide a novel device that can be readily detachably applied to an automobile truck or to other supports, whereby lumber or similar materials can be quickly and easily loaded upon or unloaded from the automobile truck or supports to which the device is applied.

A further object of my invention is to provide a device of the type described which is simple and durable in construction and can be manufactured cheaply.

A further object of my invention is to provide a device that can be operated readily by hand and is not liable to easily get out of order.

Other objects and advantages will appear in the following specification, and the novel features of the invention will be particularly pointed out in the appended claims.

My invention is illustrated in the accompanying drawings, forming part of this application, in which—

Figure 1 is a side view of the device operatively applied,

Fig. 2 is a plan view of the device, partly in section, and

Fig. 3 is a section along the line 3—3 of Fig. 2.

In carrying out my invention, I make use of an automobile truck 1. I provide a frame 3 consisting of side portions 6 and 7 and end portions 8 and 9, which are mounted upon a chassis 2 of the truck in an ordinary manner. A plurality of driven shafts 10 have their ends journaled to rotate in the side 6 at 11, and in the bearings 13 in the side 7 at 12. Rollers 4 are rigidly mounted upon the driven shafts 10. The bearings 13 have integral extensions 15 in which a transverse counter shaft 16 is rotatably mounted. Gears 17 carried upon the ends of the shaft 10 mesh with gears 18 carried by the shaft 16. A housing 19 covers the meshed gears 17 and 18 and is secured to the side 7. A drive shaft 21 is disposed parallel to the shafts 10 and is journaled in the sides 6 and 7 at 29. The end of the drive shaft 21, extending through the side 6, carries a gear 22 which meshes with a gear 23 which is keyed to the corresponding end of one of the shafts 10. The opposite end of the drive shaft 21 projects beyond the side 7 and has keyed upon its end a ratchet wheel 24. A handle 28 is loosely mounted upon the drive shaft 21 and may be thrown into operative engagement with the ratchet 24 and consequently with the shaft 21, by means of a ratchet pawl 25 which is pivotally secured at 26 to the ratchet handle 28. The pawl 25 has fingers 26 and 27. The finger 26 is adapted to engage the ratchet wheel 24 so that the ratchet wheel and the drive shaft 21 may be rotated clockwise. The finger 27 is then out of operative position, but may be moved toward the ratchet wheel 24 so that the rotatable movement of the same is controlled by the finger 27, and the ratchet wheel 24 may be rotated counterclockwise.

Referring to Fig. 1 of the accompanying drawings, it will be noted that I show a device mounted upon suitable supports 5. It is to be understood that this device is identical to the device mounted upon the automobile truck 1.

From the foregoing description of the various parts of the device, the operation thereof may be readily understood. A quantity of lumber is placed upon the device which rests upon the supports 5. The truck 1 is moved into position so that the device attached to the truck is in alinement with the device mounted upon the supports 5. The lumber is transferred from the device upon the supports 5 to the truck by operation of the handle 28, since it will be noted that the rollers 4 will be actuated simultaneously by the rotatable movement imparted through the gear train arranged as described.

When the lumber has been moved until only the roller adjacent the truck is in contact therewith, it will be necessary to operate the handle 28 of the device upon the truck in order to complete the transfer of the lumber. Before doing this, both the finger 26 and the finger 27 of the pawl 25 are moved out of engagement with the ratchet wheel 24 to prevent the handle from being rotated and possibly injuring the operator. The lumber is unloaded by operating the handle in a manner similar to that described and may be deposited upon the ground or in any desired location.

It will be obvious that the use of the device will result in a great saving of time and money, since the time consumed in loading and unloading the truck is reduced to a minimum. The truck would be employed during the entire time in transferring materials from place to place, and would not stand idle for a great part of the time while the materials are being loaded and unloaded, as is the case where the loading is done entirely by hand or without mechanical loading and unloading devices which are expensive and cumbersome.

It will be noted that a second ratchet wheel 29 is keyed directly to the end of one of the driven shafts 10. A handle 30 is loosely mounted upon the same driven shaft 10 and may be thrown into operative engagement with the ratchet 20 and consequently with the driven shaft 10 by means of a ratchet pawl 31 which is pivotally secured to the handle 30 and has fingers (not shown) corresponding to the fingers 26 and 27 of the pawl 25. In case the load upon the rollers 11 is exceptionally heavy, the handle 30 and the handle 28 are both operated to move the load.

I claim:

1. A device of the type described comprising a rectangular frame, a plurality of driven shafts mounted in the sides of said frame, a roller rigidly mounted on each of said shafts, said rollers having smooth surfaces, a bevel gear carried by the end of each driven shaft, a transverse shaft extending transversely with respect to said driven shafts and having bevel gears keyed thereto, each one of said gears being adapted to mesh with one of said first named bevel gears, a casing being adapted to cover each group of gears, a gear mounted on the opposite end of one of the central driven shafts, a driving shaft disposed parallel to said driven shafts and having a gear adapted to engage the gear mounted on said driven shaft, a cogged wheel carried by said driving shaft, a handle loosely mounted on said driving shaft and having a pawl adapted to engage said cogged wheel and rotate it in either direction, whereby said rollers can be rotated intermittently in either direction or continuously in either direction, and a second actuating means carried by one of the driven shafts, said means being adapted to coöperate with said driving shaft.

2. A device of the type described comprising a rectangular frame having parallel sides and ends, a support for said frame, a pluraltiy of driven shafts journaled in the sides of said frame, a roller keyed to each of said driven shafts between the sides of the frame, a gear keyed to an end of each of the driven shafts, a gear keyed to the opposite end of one of the driven shafts, a countershaft carried by said frame upon bearings projecting from a side thereof and disposed parallel to said side, gears keyed to said countershaft and adapted to engage the gears carried upon the adjacent ends of said driven shafts, a drive shaft journaled in the sides of said frame, said drive shaft being disposed parallel to said driven shafts and having its ends projecting beyond the sides of the frame, a gear keyed to one end of said drive shaft and adapted to mesh with the gear carried on the corresponding end of a driven shaft, and means connected to the opposite end of said drive shaft whereby an actuating force may be imparted to the driven shafts to rotate the rollers simultaneously.

3. A device of the type described comprising a frame adapted to be attached to a support, said frame having parallel sides and ends, a plurality of driven shafts carried by the frame, said shafts being disposed in parallel relation and spaced apart, a cylindrical roller rigidly mounted on each shaft between the sides of the frame, a gear carried on one end of each driven shaft, a gear keyed to the opposite end of one of said driven shafts, a transverse counter shaft carried by said frame exterior and parallel to the sides thereof, a gear carried by said transverse counter shaft to mesh with said first named gear, housings carried by the frame to protect the meshed gears, a drive shaft journaled in the sides of the frame, said drive shaft being disposed parallel to said driven shafts, a gear keyed to one end of the drive shaft and adapted to mesh with the gear keyed to the end of one of said driven shafts, a handle loosely mounted upon the opposite end of said drive shaft, and means for holding the handle in engagement with the drive shaft, whereby the latter may be operated by hand, said means comprising a ratchet wheel keyed to the end of the drive shaft 21, a pawl pivoted to said handle and having a pair of fingers, each of which is adapted to operatively engage said ratchet wheel.

JOHN DYER.